Patented Dec. 8, 1925.

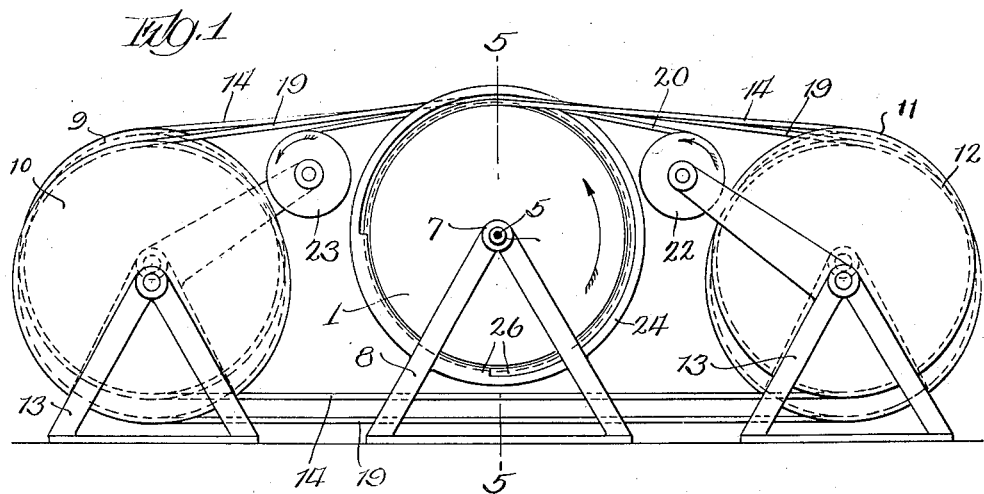
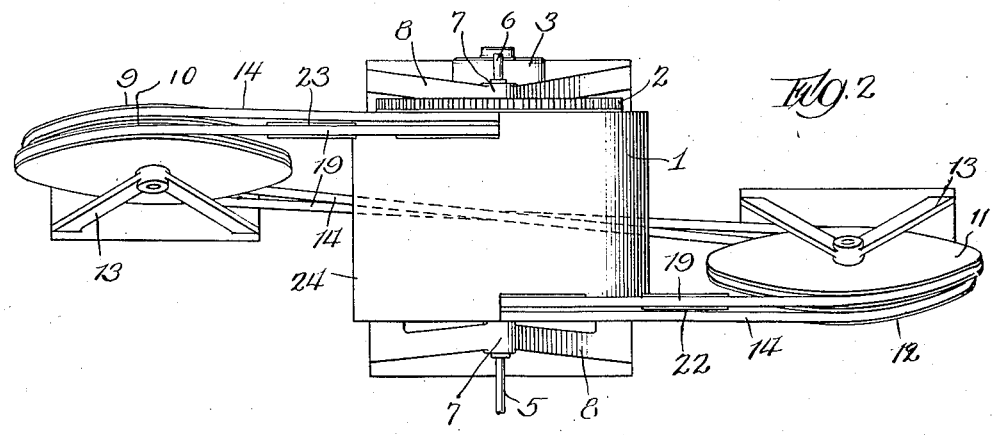
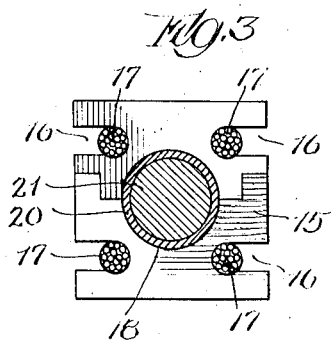
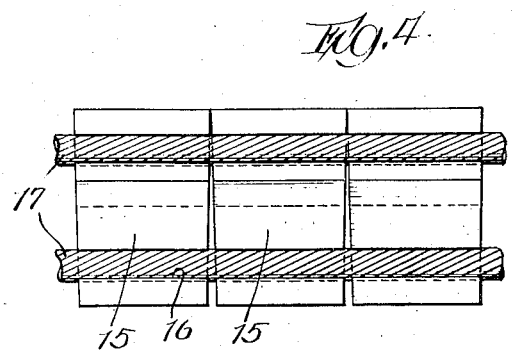

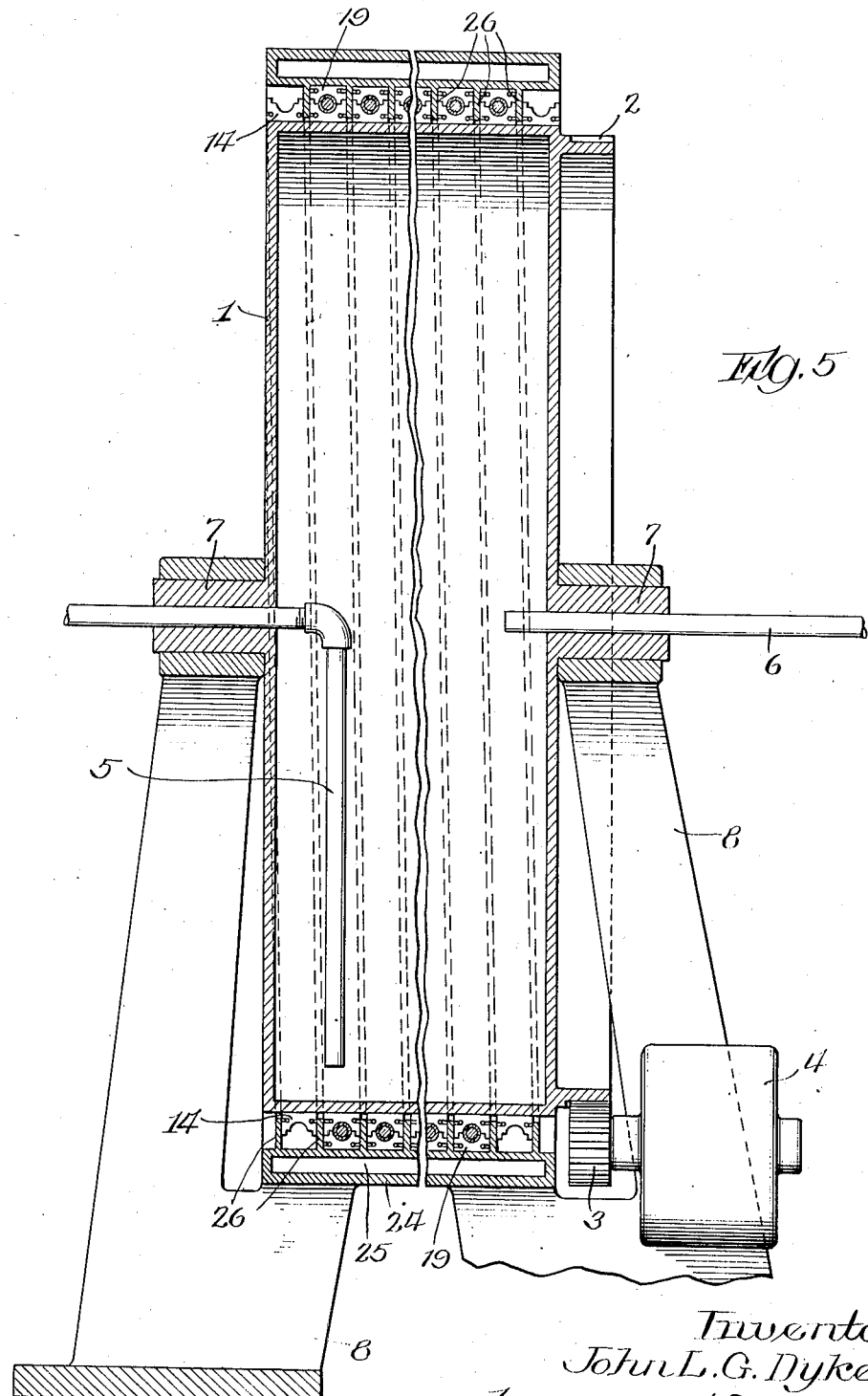

1,564,473

UNITED STATES PATENT OFFICE.

JOHN L. G. DYKES, OF CHICAGO, ILLINOIS.

PROCESS AND APPARATUS FOR VULCANIZING ARTICLES.

Application filed October 25, 1922, Serial No. 596,834. Renewed October 26, 1925.

*To all whom it may concern:*

Be it known that I, JOHN L. G. DYKES, a citizen of the United States, and resident of Chicago, Cook County, Illinois, have invented a certain new and useful Improvement in Processes and Apparatus for Vulcanizing Articles, of which the following is a specification.

This invention relates to the method and apparatus for making rubber articles, by a practically continuous method of vulcanization thereof, and is in the nature of an improvement on the apparatus and method shown and described and covered broadly in prior application No. 408,764 filed September 7, 1920.

Generally stated, the object of the present improvements is to provide a novel apparatus and method whereby a spiral path of travel is provided for the stock from which the desired rubber article is to be made, of such character that the process or method may be carried on continuously and without the necessity of any axial shifting of the apparatus on the vulcanizing drum, it being observed that in said prior application the mold sections are required to shift from one end of the drum to the other, but with the apparatus and method hereinafter described such displacement or shifting of the molding means is not necessary, inasmuch as the improvements herein disclosed contemplate the use of an endless belt as the means for providing the groove in which the stock is wound spirally while being vulcanized, as will hereinafter more fully appear.

It is also an object to provide certain details and features of construction tending to increase the general efficiency and desirability of a continuously operating spiral vulcanizing apparatus and method of this particular character.

To the foregoing and other useful ends the invention consists in matters hereinafter set forth and claimed, and shown in the accompanying drawings, in which—

Figure 1 is a side elevation of a vulcanizing apparatus embodying the principles of the invention.

Figure 2 is a plan of said apparatus.

Figure 3 is an enlarged cross section of the two endless belts which form the upper and lower halves of the endless mold in which the stock is vulcanized.

Figure 4 is a section on line 4—4 in Figure 3.

Figure 5 is an enlarged section on line 5—5 in Figure 1.

As thus illustrated, the apparatus comprises a hollow drum 1 having gear teeth 2 at the side thereof to engage the driving pinion 3, which latter may be driven by a motor 4 of any suitable character. Steam may enter the drum through the pipe 5 and may be discharged through the pipe 6 in a manner that will be readily understood, whereby the drum is maintained at vulcanizing temperature. Said drum is supported for rotation in bearings 7 supported by frames 8 of any suitable character. Idlers 9, 10, 11 and 12 are provided and supported on frames 13 in the manner shown. An endless belt 14 travels around the idler 12 and then around the drum 1 several times and then off and on to the idler 9 and then back to the idler 12, so that this belt is wound spirally on the drum. Said belt comprises links 15 with notches 16 therein for the cables 17, the links or sections 15 being held close enough together to provide a practically continuous groove 18 in which to receive the stock from which the desired article is to be made. A similar belt 19 travels from the idler 10 on to the second convolution of the belt 14, and then around upon the latter until next to the last convolution is reached at the other end of the drum, and this belt 19 then departs from the drum and travels to the idler 9 and from the latter back to the idler 10, thus providing a spiral upper or outer half for the spiral mold provided by the two belts, it being understood that the upper or outer belt is exactly the same as the lower or inner belt which engages the smooth surface of the drum. With this arrangement, it will be seen that a spiral path of travel is formed and established for the stock from which the desired rubber article is to be made.

Now it will be understood that the apparatus and the method shown and described are not limited to the manufacture of any particular article. As shown and described and as illustrative of one use of the invention, the apparatus and method are employed in the making of rubber hose pipe. For this purpose, therefore, the rubber and fabric 20 are first applied to a lead core 21, of suitable length, and the stock thus formed is wound upon the drum 22 in a suitable manner. The stock is fed from this drum 22 to a point underneath the upper strand of the belt 19, and the stock feeds continuously between the two belts 14 and 19, and is wound spirally around the drum. At the other end of the drum the vulcanized stock comes off and is wound on another drum 23, the drums 22 and 23 being supported in any suitable manner. It will be understood that the apparatus is driven at any desired or suitable speed, so that the rubber hose pipe stock is kept moving and is vulcanized at the same time in the desired manner.

To ensure the desired results, a cylindric casing 24 having a steam chamber 25 is placed around the drum, and is provided with a spiral channel on its inner side, formed by the spiral web 26 in a manner that will be readily understood. This casing is supported by the frames 8, so that it is stationary, while the drum revolves or rotates, and at such time the inner belt 14 will shift or slide laterally and very gradually as it traverses the spiral path of travel thus formed.

While the apparatus and process shown and described are illustrated in connection with the manufacture of rubber hose pipe, it will be understood that various other articles can be made, by using mold sections of any suitable or desired shape and form, in the construction of the two endless belts, without departing from the spirit of the invention. The improved method, therefore, contemplates the establishing of a spiral path of travel for the stock from which the desired article is to be made, while maintaining said path of travel at vulcanizing temperature, and thus continuously vulcanizing the stock while wound in spiral form without axial shifting or displacement of the spiral stock which is being vulcanized. In said prior application, the stock is wound spirally and is vulcanized while thus maintained in spiral formation, but while traveling spirally the stock at the same time moves axially, or in the direction of the axis of the spiral and vulcanizing means. In accordance with the present improvement, however, the spiral stock while being vulcanized does not move axially, but simply traverses the spiral path formed by the two endless belts which form the vulcanizing mold, as though the drum stood still.

It will be understood that any suitable means may be employed for supplying steam to the chamber 25 in the cylindrical shell or casing. With the arrangement shown and described, the inner belt 14 has two more convolutions on the drum than the outer belt 19, thereby to facilitate the feeding of the stock to the spiral mold and the feeding of the vulcanized product away from the mold, in the manner shown and described.

After the hose pipe is thus vulcanized, the lead core may be removed in any suitable or desired manner, as by forcing air into the hose pipe, and the pipe can then be cut into sections of the desired length.

It will be seen that the instrumentalities for forming the spiral path of travel for the materials to be vulcanized include inner and outer mold sections, which are separate, and which enter the spiral path of travel at one end of the vulcanizing drum and which leave the spiral path of travel at the other end of the vulcanizing drum, whereby the materials to be vulcanized are formed between successive outer sections and successive inner sections and each outer section having the inner section co-operating therewith to produce the desired formation for the materials to be vulcanized.

What I claim as my invention is—

1. In apparatus for vulcanizing rubber articles, the combination of means including an endless belt wound spirally to establish a spiral path of travel for the stock from which the desired article is to be made, means for feeding the stock to said spiral path of travel, means in the form of a belt traveling spirally over the stock, and means for heating the stock to vulcanizing temperature while traveling in said path.

2. Apparatus for vlucanizing rubber articles, comprising means to form a spiral forming and vulcanizing path for the stock from which the desired article is to be made, including a belt wound spirally to travel with the stock, means for feeding the stock to said path of travel, and means to hold the spiral against endwise displacement.

3. The process of vulcanizing rubber articles, comprising feeding the stock along a predetermined spiral path of travel and heating the stock to vulcanizing temperature while thus traveling in spiral formation in said path, so that the stock is vulcanizing while being wound in spiral formation, and holding the spiral against axial displacement during the rotation thereof.

4. A process as specified in claim 3, said stock being fed with a core therein, and thereafter removing said core from the finished article.

5. A process as specified in claim 3, and thereafter making the vulcanized article hollow.

6. Apparatus as specified in claim 1, the two belts having opposing faces formed to shape the article in the desired manner, and the two belts thus forming a spiral mold.

7. Apparatus as specified in claim 1, each belt comprising mold sections and means to flexibly connect the sections together.

8. Apparatus as specified in claim 1, in combination with a spiral wall interposed between the convolutions of the spiral mold formed by the two belts, and means for holding said spiral walls stationary during the rotation of the spiral mold.

9. In vulcanizing apparatus, the combination of instrumentalities to form a spiral path of travel for the materials to be vulcanized, devices for causing the materials to have movement along said path of travel at the desired rate of speed for vulcanizing purpose, and means to apply vulcanizing heat to said materials while moving along said spiral path of travel, said instrumentalities comprising separate inner and outer mold sections for the materials to be vulcanized, all of said mold sections entering said path of travel at one end of the spiral and leaving said path of travel at the other end of the spiral.

10. A structure as specified in claim 9, said instrumentalities comprising a rotary drum around which said spiral path of travel is formed, so that the axis of the spiral is coincident with the axis of the drum, and said drum having an interior heating chamber forming part of said means for supplying vulcanizing heat to said materials.

11. A structure as specified in claim 9, comprising an endless belt wound spirally to hold said materials in said spiral path of travel thereof.

12. In apparatus for shaping materials in the desired form, the combination of forming means to receive the materials, and spiral means to press the materials into said forming means, said forming means comprising a series of molds, each mold comprising an outer section and an inner section, the two sections of each mold being held together by said spiral means during the operation of the apparatus.

13. In apparatus for vulcanizing rubber articles, the combination of means to establish a spiral path of travel for the stock from which the desired article is to be made, means for feeding the stock to said spiral path of travel, means in the form of a belt traveling spirally over the stock, and means for heating the stock to vulcanizing temperature while traveling in said path, comprising a rotary drum having said spiral path of travel on the outer surface thereof, with a series of molds in which the stock is formed, said molds being held against said drum by said belt, and each mold comprising an outer section and an inner section, whereby the stock from which the articles are made is compressed between the outer and inner sections of the successive molds while the drum is rotating.

JOHN L. G. DYKES.